United States Patent [19]

Hands

[11] 4,437,333
[45] Mar. 20, 1984

[54] APPARATUS AND METHOD FOR ASBESTOS FIBER RELEASE POTENTIAL

[75] Inventor: David Hands, Southfield, Mich.

[73] Assignee: Clayton Environmental Consultants, Inc., Southfield, Mich.

[21] Appl. No.: 383,689

[22] Filed: Jun. 1, 1982

[51] Int. Cl.³ ............................................. G01N 3/38
[52] U.S. Cl. .......................................... 73/12; 73/159; 73/432 R; 73/863.23
[58] Field of Search .......... 73/12, 159, 432 Z, 863.23, 73/864.41

[56] References Cited

U.S. PATENT DOCUMENTS

| | | | |
|---|---|---|---|
| 1,201,326 | 10/1916 | Matsumura | 73/12 |
| 1,869,067 | 7/1932 | Malmquist | 73/12 X |
| 2,324,126 | 7/1943 | Anway | 73/159 |
| 2,324,127 | 7/1943 | Anway | 73/12 X |
| 2,388,246 | 11/1945 | Berger | 73/12 |
| 3,843,198 | 10/1974 | Reynolds | 73/864.41 X |
| 3,957,469 | 5/1976 | Nebash | 73/863.23 X |
| 4,090,392 | 5/1978 | Smith et al. | 73/863.23 |
| 4,383,451 | 5/1983 | Chapel | 73/864.41 |

FOREIGN PATENT DOCUMENTS 964488  3/1975  Canada .................................. 73/12

Primary Examiner—S. Clement Swisher
Assistant Examiner—Tom Noland
Attorney, Agent, or Firm—Stephenson & Boller

[57] ABSTRACT

Apparatus and method for determining the asbestos fiber release potential of asbestos-containing compositions comprises an impact member which is repeatedly impacted with a selected area of the asbestos-containing composition and in which asbestos fibers which become airborne as a result of the impacts are collected by means of a collector system disposed around the area of impact. The invention has particular utility for the in situ testing of asbestos-containing fire-retardant compositions which have been previously applied to structural elements of buildings.

18 Claims, 5 Drawing Figures

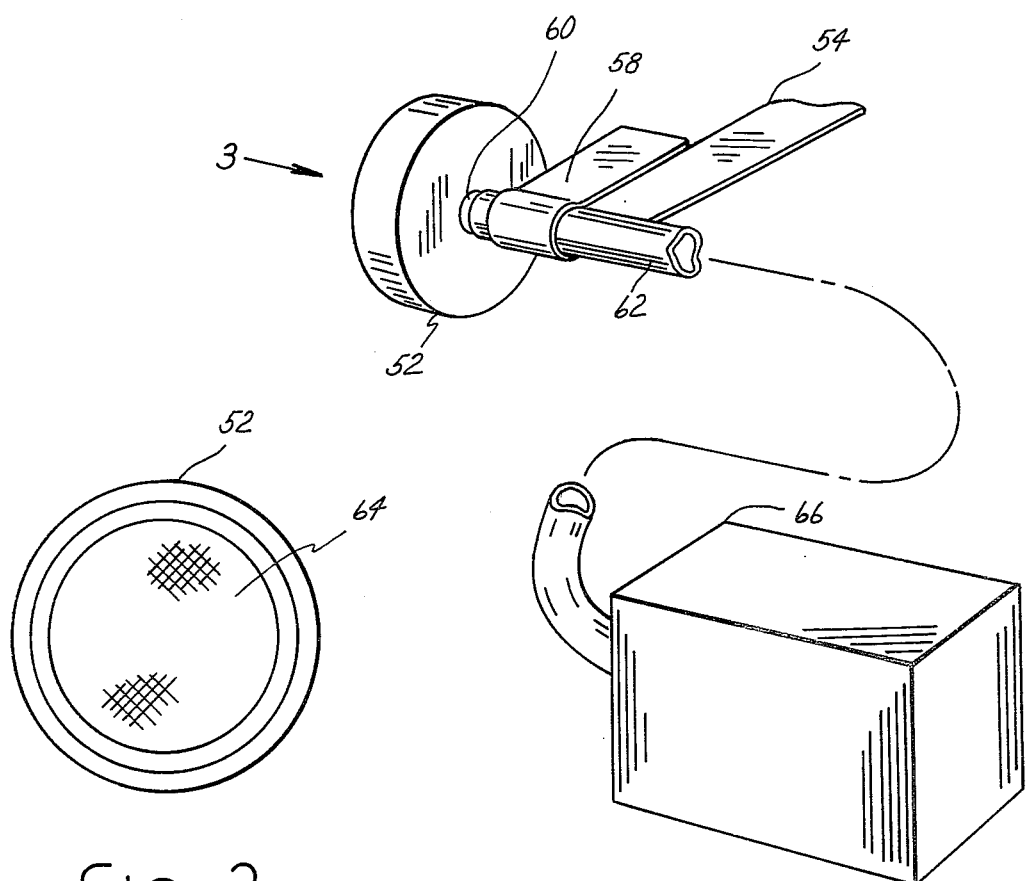
fig. 3
fig. 2
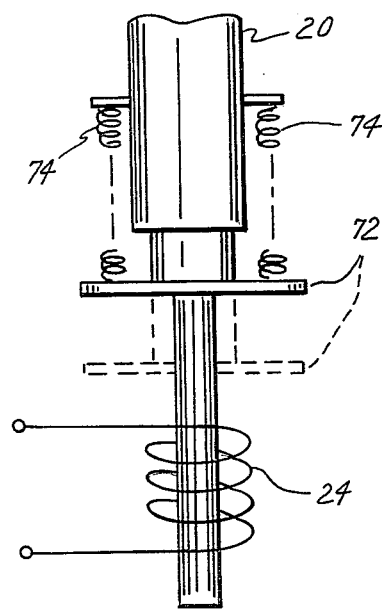
fig. 4
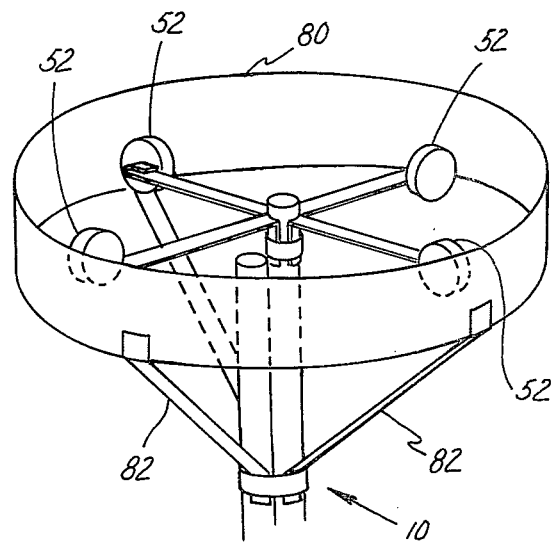
fig. 5

APPARATUS AND METHOD FOR ASBESTOS FIBER RELEASE POTENTIAL

BACKGROUND AND SUMMARY OF THE INVENTION

This invention relates to test apparatus and method for determining the asbestos fiber release potential of asbestos-containing compositions.

Asbestos has long been recognized as a material which has excellent fire-retardant properties. For many years it was used in building construction where fire-retardant construction was desired. More recently environmental concerns relative to the human health implications of asbestos have been expressed. One of the concerns involves the inhalation of airborne asbestos fibers and their resultant accumulation in the lungs. One present belief is that above a certain threshold level of exposure to a population there exists a correlation of the incidence of health problems including certain cancers to the amount of asbestos accumulation. Due to the rather extensive and widespread usage of asbestos as a fire-retardant material in building construction over a number of years, there presently exist environmental situations where appreciable numbers of individuals come within the vicinity of asbestos-containing materials. The mere existence of asbestos-containing material in an environment does not of itself create a health problem. Rather, concern arises about release of asbestos fibers from a material such that they become airborne and hence susceptible to being inhaled by individuals who are present in the immediate environment. Whether an existing building containing asbestos fire-retardant materials in fact poses a potential asbestos exposure problem which could have health implications has heretofore not been determinable on any reliable scientific basis. The only documental test procedure of which applicant is aware is ASTM E736-80 involving Cohesion/Adhesion of Sprayed Fire-Resistive Materials Applied to Structural Members, and that is not addressed to the matter of asbestos fiber release potential.

The present invention is directed to test apparatus and method which can provide a meaningful indication as to the fiber release potential of asbestos-containing materials.

One commonly used technique for fire-guarding structural elements of a building involved the creation of a fire-retardant composition containing a percentage of asbestos. In general the compositions which were in fact used in the field were prepared by contractors on site without particular concern for the relative proportion of asbestos in the compositions. For example the compositions were often prepared by mixing asbestos into a carrier which was subsequently sprayed onto the structural building elements. The sprayed-on fire-guarding composition cured into an overlying layer somewhat like a plaster composition. In any given installation the asbestos content could range over a wide percentage; for example a range of ten to fifty percent was not atypical. With aging and use the asbestos-containing fire-resistive compositions in a building may crumble, disintegrate or otherwise come into a state of disrepair. Such conditions can give rise to the release of asbestos fibers to the air and such aiborne fibers may well remain within the building so that occupants are exposed to them.

Often the fire-guarded elements were the structural members of the building such as the steel beams. While steel will obviously not combust, the reason for fire-guarding is to prevent the beams from buckling, sagging and leading to ultimate collapse of the building structure in the event of fire. The only way to determine the potential for release of asbestos fibers in a given building is by means of in situ testing. Insofar as applicant is aware there has heretofore been no procedure suggested for accomplishing this, much less accomplishing it in a manner which is reasonably indicative of the fiber release potential.

One of the complicating factors in attempting such in situ testing is that the structural building elements such as the beams are often in locations which are accessible only with difficulty. For example a beam may be located above a drop ceiling and it is necessary to obtain access through the ceiling to get to the beam. Due to the design of many buildings these spaces between the beams and other partitioning structures such as the drop ceiling are designed as plenums for ventilation purposes and hence they are subject to varying degrees of air flow. In order to accomplish an in situ testing procedure where airborne release of fibers is to be measured it is necessary that a reliable testing procedure address the problem of varying air flow in the vicinity where testing is to be done. With the invention variable airflow will not complicate or confound measurements.

The present invention is directed to test apparatus and method for determining in situ the release potential of asbestos fibers and is particularly well suited for use in buildings where the asbestos-fiber-containing composition has been previously applied to structural elements within the building such as described above. The invention provides a test procedure for the asbestos fiber release potential for various compositions and at various sites so that meaningful indicators of release potentials can be obtained. Furthermore the invention may be practiced in locations where in situ testing procedure is encumbered by various disturbing factors such as described above.

The foregoing features, advantages, and benefits of the invention, along with additional ones, will be seen in the ensuing description and claims which should be considered in conjunction with the accompanying drawings. The drawings disclose a preferred embodiment of the invention according to the best mode contemplated at the present time in carrying out the invention.

BRIEF DESCRIPTION OF THE DRAWINGS

FIG. 2 is an enlarged perspective view of a portion of FIG. 1 illustrating further detail as taken in circle 2.

FIG. 3 is a view taken in the direction of arrow 3 in FIG. 2 on a slightly enlarged scale.

FIG. 4 is a diagrammatic view illustrating a modification to one portion of the apparatus in FIG. 1.

FIG. 5 is a view illustrating another modification.

DESCRIPTION OF THE PREFERRED EMBODIMENT

Figure 1:
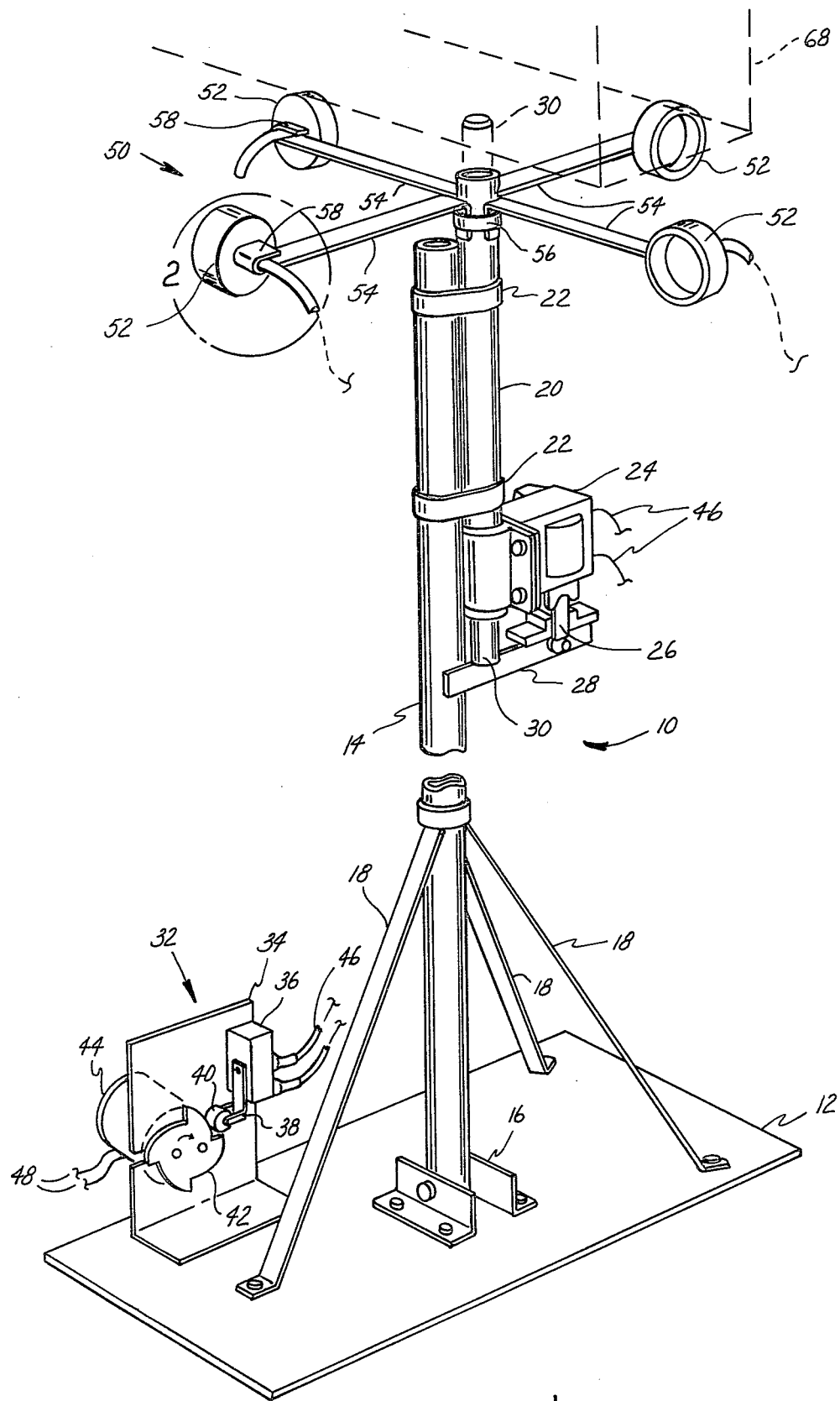
FIG. 1 is a perspective view illustrating test apparatus embodying principles of the invention in the practice of the method of the invention.

FIG. 1 illustrates test apparatus 10 embodying principles of the present invention and in use practicing the method of the invention. Apparatus 10 comprises a flat rectangular base 12 on which an upright tube 14 is supported by means of a mount 16 at the base of the tube and by means of three struts 18. Tube 14 is in the form of a cylindrical steel tube, and supported on the upper end segment of tube 14 is a further tube 20. The two tubes 14 and 20 are mounted in side-by-side abutment and secured together by means of spaced apart bands, or straps 22.

Mounted on the lower end and to one side of tube 20 is an electromagnet 24. The electromagnet is of conventional construction comprising a solenoid winding which is adapted to be energized from a suitable electric power source. An armature 26 is displaced by the electromagnet when the electromagnet is energized and de-energized. Connected to armature 26 is an actuator 28. Actuator 28 is disposed in a generally horizontal orientation to underlie tube 20 in spaced relation to the lower end of that tube.

The apparatus further includes an impact member 30 which is in the form of a cylindrical projectile which fits closely within the bore of tube 20. The solid line position of the projectile 30 as shown in FIG. 1 illustrates the lower end of the projectile resting on the top edge of actuator 28. The projectile has a length which is less than the length of tube 20 but is long enough to remain in engagement with tube 20 when it is resting on actuator 28. When electromagnet 24 is energized armature 26 is suddenly forcefully drawn into the body of the electromagnet and correspondingly actuator 28 is suddenly forcefully displaced upwardly. This in turn imparts kinetic energy to projectile 30 launching it upwardly through tube 20. The projectile emerges at the upper end of tube 20 (broken line position of FIG. 1) where it impacts the asbestos-containing composition under test. The length of projectile 30 and the position of the upper end of tube 20 are such that the lower end segment of the projectile remains in engagement with the tube at impact so that after impact the projectile falls by force of gravity back through the tube onto actuator 28. The mass of the projectile 30 and the launching force imparted by the electromagnet and actuator are such that a suitable impacting force is applied to the composition under test. This will be explained in somewhat greater detail later on.

In order to launch the projectile 30 at periodic times over a given testing interval a timer mechanism 32 is operably associated with electromagnet 24. The timer mechanism 32 may be conveniently mounted on base 12. The illustrated construction comprises a mounting bracket 34 on which an electric switch 36 is mounted. The switch comprises an actuating lever 38 having a roller 40 at its distal end. A rotary cam 42 is disposed adjacent switch 36 so that the roller 40 tracks the cam profile. As can be seen in FIG. 1 cam 42 comprises four camming segments each of which is effective to operate switch 36 via the actuator 38. Cam 42 is driven in the clockwise direction as viewed in FIG. 1 by means of an electric motor 44 which may contain a suitable gear reduction. By operating cam 42 at a rotational speed of one revolution per minute switch 36 is actuated every fifteen seconds. This in turn operates electromagnet 24 every fifteen seconds so that the projectile 30 will impact the composition under test four times each minute at fifteen second intervals. The switch 36 is connected to the electromagnet by means of suitable lead wires 46, and motor 44 is itself connected to a suitable electric power source by lead wires 48.

The test apparatus 10 further includes a collector system 50. The illustrated collector system 50 comprises four individual filter cassettes 52 which are arranged in any array about the area of impact. The array comprises the filter cassettes being located at 90° intervals about a common circle which is centered about the tube 20. Each cassette is supported at the same radius from tube 20 by means of a corresponding arm 54. The radially inner end of each arm is flanged downwardly and these downward flanges are banded together about tube 20 by means of a band or strap 56. The radially outer end of each arm 54 is curled back at about 180° to provide a mounting receptable 58 for the filter cassette 52.

The preferred filter cassette is a conventional device having a circular perimeter one end of which is walled. A nipple 60 is centrally provided in that wall of the filter cassette and in the illustrated test apparatus a flexible tube 62 is fitted onto nipple 60 and the interfitted tube and nipple are lodged within the receptacle 58 as shown. As can be seen with referrence to the drawings and in particular with reference to FIG. 3 the face of the cassette opposite nipple 60 is entirely open. A filter element 64 is disposed within the filter cassette facing the open end as can be seen in FIG. 3. Thus the arrangement is commonly referred to as "open face" sampling.

As can be seen in FIG. 2 the opposite end of each tube 62 is connected to its own personal sampling pump 66. The personal sampling pump is a conventional device which is operable to draw a predetermined amount of airflow through it. For example, two liters per minute is a representative figure. Each personal sampling pump is an entirely self-contained and self-powered (by means of batteries) unit which is well-suited for use with test apparatus 10. The connection of each personal sampling pump 66 through tube 62 to a filter cassette 52 causes a vacuum force to be applied such that airborne particulate or fibrous materials which are in the vicinity of the open face of the cassette are drawn or sucked onto the filter 64. During the test procedure the pumps are continuously operated so that at all times during the test vacuum force is applied to each filter cassette. By arranging the filter cassettes in an array particulate materials in the vicinity of the impact area will be collected in a representative fashion.

FIG. 1 illustrates apparatus 10 in use in a test procedure. The asbestos-fiber-containing composition is on the surface of a structural building member shown in phantom and designated by the reference numeral 68. For example of this would be a horizontal beam to which the asbestos-containing, fire-retardant composition has been previously applied. The test apparatus 10 is placed in a suitable position in relation to the structural element 68 so that a desired test area of the composition will be impacted by projectile 30. The personal sampling pumps 66 are turned on and motor 44 is energized. The projectile 30 impacts the selected area of the composition approximately every fifteen seconds. Any particles or fibers which are released to the air will be in the vicinity of the impact area. At least some of these fibers which come across the faces of the cassettes will be sucked into the filter elements 64 so that released materials will be collected. It has been found that a twenty minute test is suitable and therefore the number of impacts which will be delivered to the asbestos-fiber-containing composition will equal eighty. At the conclusion of the twenty minute interval the test apparatus is immediately removed with the personal sampling pumps 66 being promptly turned off. The open faced cassettes at this time are promptly capped to prevent continued exposure. The individual filters are subsequently removed and analyzed by a suitable procedure for determining the amount and nature of the fiber collection. For example a suitable procedure utilizes the NIOSH method in which collected fibers are counted under a microscope.

By utilizing the same standardized test procedure for testing various asbestos-fiber-containing compositions, and at various sites, a reliable indicator is developed for determining the relative fiber release potential of a given installation. In evaluating a building it will typically be desirable to perform multiple tests at different test sites in order to provide an accurate assessment for the totality of the building. Thus the number of actual tests can be determined on an emperical basis for a given building. However the same consistency in each test procedure should be maintained.

The modification shown in FIG. 5 comprises a cylindrical shroud 80 disposed circumferentially around the array of filter cassettes 52. The shroud is positioned with its top edge in proximity to (within an inch or so, for example) the overlying structural element under test. The shroud is suitably supported from the test apparatus 10, for example by means of struts 82 extending from the upright structure to the lower perimeter of the shroud. The purpose of the shroud is to prevent air currents from carrying released materials away from the cassettes before they can be collected. This promotes repeatability from one environment to another by substantially minimizing, or even totally eliminating, the effect of air currents on testing. Air currents have been found to vary within a building and from building to building. Whether the shroud is in fact used for a given test depends upon ambient conditions.

By way of example, test procedures which are contemplated with the disclosed embodiment of apparatus comprise the filter cassette being 37 millimeter type and with the filters being mixed cellulose ester filters (MCEF), type AA. The projectile which has been used may be fabricated from any suitable material and a wooden rod has been found to be suitable. It may be desired to bevel the perimeter of the impacting edge of the rod so that a substantially constant force per unit area can be imparted. A typical figure which has been measured is 0.044 newtons per square centimeter. The presently preferred test procedure has been run on the 20 minute test interval and with the sampling pumps also being operated at the two liter per minute flow rate each.

It will be appreciated that the relevant test parameters may have values other than those just given. Regardless of the particular values used, consistency in their use is important for comparative purposes because the determination of fiber release potential is in many situations a relative matter rather than an absolute measurement. This is because predictability of the actual condition of any given asbestos-containing composition which will ensue is difficult, and it is the deterioration in the condition of a composition, due to whatever cause or causes, which is a major factor in the actual release of asbestos fibers. Thus testing can reveal whether a site presently poses a potential problem. If no potential problem is indicated, retesting may be desirable in the future when the composition has aged more and perhaps encountered other conditions of wear and tear.

FIG. 4 illustrates a modified embodiment which uses a slightly different construction for operating the projectile. In this regard electromagnet 24 is used to cock the actuator which is in the form of a pusher 72. The pusher 72 is connected by means of springs 74 to a fixed location on the wall of tube 20. When the solenoid is actuated the pusher 72 is operated to the broken line position thereby tensioning springs 74. Upon release of the solenoid the holding force on the pusher is released and the springs pull the pusher upwardly so as to impart kinetic energy to the projectile. Thus it is strictly the spring force which is used to impart kinetic energy to the projectile and this may be subject to less variation than provided by a solenoid alone. However whether this factor is even critical depends upon the specific requirements and the specific constructional details. This is deemed a matter of judgement as to what tolerance is acceptable in variations of the launching force from a nominal value.

The invention thus has been shown to provide a new and improved apparatus and method for asbestos fiber release potential. While a preferred embodiment has been disclosed, it will be appreciated that other embodiments are contemplated within the scope of the following claims.

What is claimed is:

1. Portable test apparatus for in situ testing of the asbestos fiber release potential to ambient air of an asbestos containing composition comprising an impact member adapted to impact the exterior surface of the composition, means for operating said impact member so as to cause it to repeatedly impact a selected area of the exterior surface of the composition over a given time interval and cause a release of asbestos fibers to ambient air representative of the asbestos fiber release potential of the composition, and a collector system comprising one or more filters disposed adjacent the area of impact each having an open collection face exposed to ambient air for collecting released asbestos fibers in ambient air.

2. Portable test apparatus as set forth in claim 1 wherein said impact member comprises a projectile and said means for operating the impact member comprises a tube which is aimed at the impact area and which guides the projectile and means for imparting kinetic energy to the projectile for causing it to travel lengthwise of the tube and impact the composition at the selected area.

3. Portable test apparatus as set forth in claim 2 in which said means for imparting kinetic energy to the projectile comprises an actuator disposed at the far end of said tube from the area of impact and wherein the projectile has a length less than the length of said tube and is disposed against the actuator prior to the impartation of kinetic energy to it, the projectile traveling through the tube in response to operation of the actuator and emerging at the opposite end of the tube from the actuator.

4. Portable test apparatus as set forth in claim 3 wherein said actuator is operated by an electromagnet to impart the kinetic energy to the projectile.

5. Portable test apparatus set forth in claim 3 in which the actuator is operated by spring means to impart kinetic energy to the projectile.

6. Portable test apparatus as set forth in claim 2 in which said tube is vertically supported on a base to guide the projectile for vertical travel and is constructed and arranged such that the projectile falls by force of gravity downwardly through the tube after impacting the selected area of the composition.

7. Portable test apparatus as set forth in claim 2 including a timer mechanism for causing kinetic energy to be imparted to the projectile at predetermined times over said given time interval.

8. Portable test apparatus as set forth in claim 1 in which said collector system comprises each of said one or more filters being disposed in an open face filter cassette and means for applying vacuum to each filter cassette so as to draw released asbestos fibers onto the filter contained therein.

9. Portable test apparatus as set forth in claim 8 wherein said collector system comprises plural filters and cassettes disposed in an array about the area of impart and facing in different directions.

10. Portable test apparatus as set forth in claim 9 in which said impact member is operated in a vertical direction to cause impact with the selected area of the composition and said filter cassettes are horizontally spaced from the impact area on a common circle which is centered at the axis of travel of said impact member.

11. Test apparatus as set forth in claim 9 including a shroud disposed circumferentially around the array for blocking air currents.

12. Portable test apparatus as set forth in claim 1 in which said impact member comprises a projectile and said means for operating said impact member comprises a vertically disposed tube supported on a base with the projectile fitting closely within the vertical tube, an actuator disposed at the lower end of said tube via which kinetic energy is imparted to the projectile so that the projectile travels vertically upward through the tube to strike the area of impact, the tube being constructed and arranged such that the projectile falls back through the tube onto the actuator after impact, a timer mechanism operatively associated with the actuator for causing the actuator to impart kinetic energy to the projectile at periodic times over said given time interval and in which said collector system comprises a plurality of filter cassettes supported from the tube in an array on a common circle concentric with the tube, each cassette containing one of said filters, and personal sampling pumps operatively associated with said filter cassettes for causing vacuum to be applied to the filter cassettes so that released fibers in the vicinity of the cassettes are sucked into the filters therein.

13. Portable test apparatus as set forth in claim 1 in which said collector system comprises plural filters disposed circumferentially in an array about the area of impact and a shroud circumferentially bounding the array and area of impact.

14. A method for determining in situ the release potential of asbestos fibers from an asbestos fiber containing composition to ambient air comprising repeatedly impacting a selected area of the composition with an impact member over a given time interval and collecting in ambient air asbestos fibers released by the impacts by means of one or more filters each having an open collection face disposed proximate the impact area and exposed to ambient air, and measuring the amount of asbestos fibers collected on said one or more filters.

15. A method as set forth in claim 14 in which the repeated impact of the selected area of the composition is practiced by aiming a tube at the impact area and imparting kinetic energy to a projectile within the tube so as to cause the projectile to travel through the tube and impact the selected area and in which the collection is practiced by means of one or more filter cassettes each containing one of said filters with a personal sampling pump being connected to each filter cassette so as to provide a vacuum force which is effective to draw released asbestos fibers onto the filter contained therein.

16. A method as set forth in claim 15 in which the tube is vertically aimed and the collectors are disposed horizontally about the area of impact on a common circle which is concentric with the tube.

17. A method for determining in situ the release potential of asbestos fibers from a fire retardant asbestos containing composition which has been previously applied to a structural element of a building comprising repeatedly imparting kinetic energy over a given time interval to an impact member so as to cause said impact member to repeatedly strike said selected area and cause a release of asbestos fibers to ambient air representative of the asbestos fiber release potential of the composition, and collecting released asbestos fibers caused by impact of the member with the composition at spaced locations from the area of impact by means of one or more open face collection filters exposed to ambient air.

18. A method as set forth in claim 17 in which the structural element containing the fire retardant composition is disposed within a confined area of the building and the method is practiced so that the direction of impact is vertically upward and the collection is by means of a plurality of filter cassettes each containing one of said filters and which are disposed in a circular array in which the collectors face different directions and each filter cassette is connected to a personal sampling pump that is effective to draw therein released asbestos fibers onto the filter.

* * * * *

UNITED STATES PATENT AND TRADEMARK OFFICE
CERTIFICATE OF CORRECTION

PATENT NO. : 4,437,333
DATED : March 20, 1984
INVENTOR(S) : David Hands

It is certified that error appears in the above-identified patent and that said Letters Patent is hereby corrected as shown below:

Column 1, line 64, "aiborne" should be --airborne--.

Column 4, line 10, "receptable" should be --receptacle--.

Column 5, line 35, "cassette" should be --cassettes--.

Column 7, line 12, "impart" should be --impact--.

Signed and Sealed this

Tenth Day of July 1984

[SEAL]

Attest:

GERALD J. MOSSINGHOFF

Attesting Officer     Commissioner of Patents and Trademarks